United States Patent
Pelczarski et al.

(10) Patent No.: US 7,225,921 B2
(45) Date of Patent: Jun. 5, 2007

(54) LARGE COMPACT DISK PACKAGE WITH SLIDING COVER MEMBERS

(75) Inventors: Michael Pelczarski, Incline Village, NV (US); King Yeung Choi, Hong Kong (HK); Kwok Keung Kwong, Hong Kong (HK)

(73) Assignee: TGG Packaging Solutions, LLC, Voorhees, NJ (US)

( * ) Notice: Subject to any disclaimer, the term of this patent is extended or adjusted under 35 U.S.C. 154(b) by 194 days.

(21) Appl. No.: 10/958,437

(22) Filed: Oct. 5, 2004

(65) Prior Publication Data

US 2005/0109646 A1    May 26, 2005

Related U.S. Application Data

(60) Provisional application No. 60/509,127, filed on Oct. 6, 2003.

(51) Int. Cl.
*B65D 85/57* (2006.01)
*B65D 43/20* (2006.01)

(52) U.S. Cl. ............... 206/308.1; 206/312; 220/345.5
(58) Field of Classification Search .. 206/308.1–308.3, 206/309–313; 220/345.5
See application file for complete search history.

(56) References Cited

U.S. PATENT DOCUMENTS

| | | | | |
|---|---|---|---|---|
| 5,511,659 | A | * | 4/1996 | Bosworth ............... 206/308.1 |
| 5,799,784 | A | * | 9/1998 | Bosworth ............... 206/308.1 |
| 7,028,835 | B1 | * | 4/2006 | Rajter, Jr. ............... 206/308.1 |

* cited by examiner

*Primary Examiner*—Bryon P. Gehman

(57) ABSTRACT

The invention is a case for receiving at least one data storage disk. The case is comprised of two cover members and a base. The case opens by sliding one or both cover members away from each other to allow removal of the disk from the base. The present improved DVD or CD case has very few components which are characterized by great simplicity whereby low manufacturing and assembly cost is achieved, without sacrificing reliability and resistance to breakage or malfunctioning. The case can be accommodated in existing racks, or holders and displays.

18 Claims, 5 Drawing Sheets

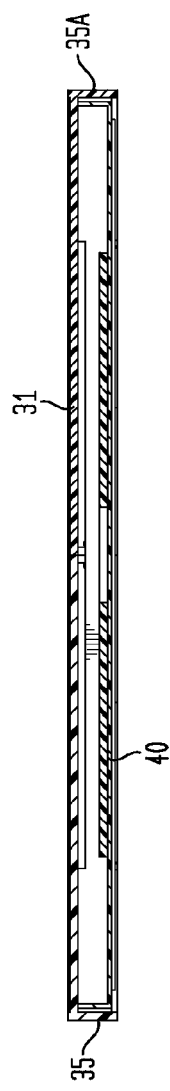
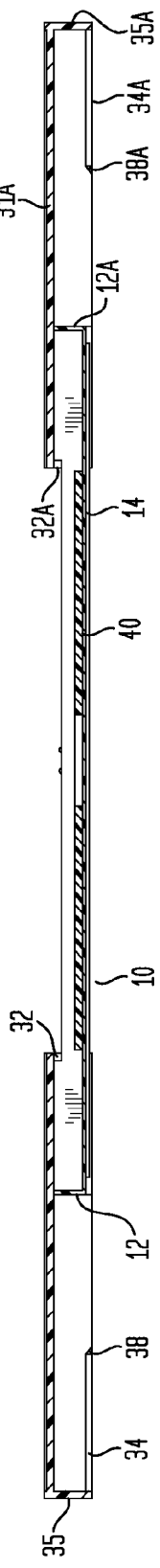
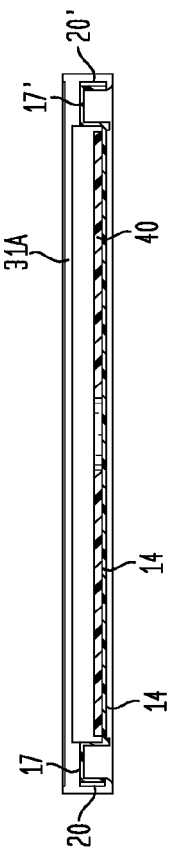
FIG. 3
FIG. 4
FIG. 5

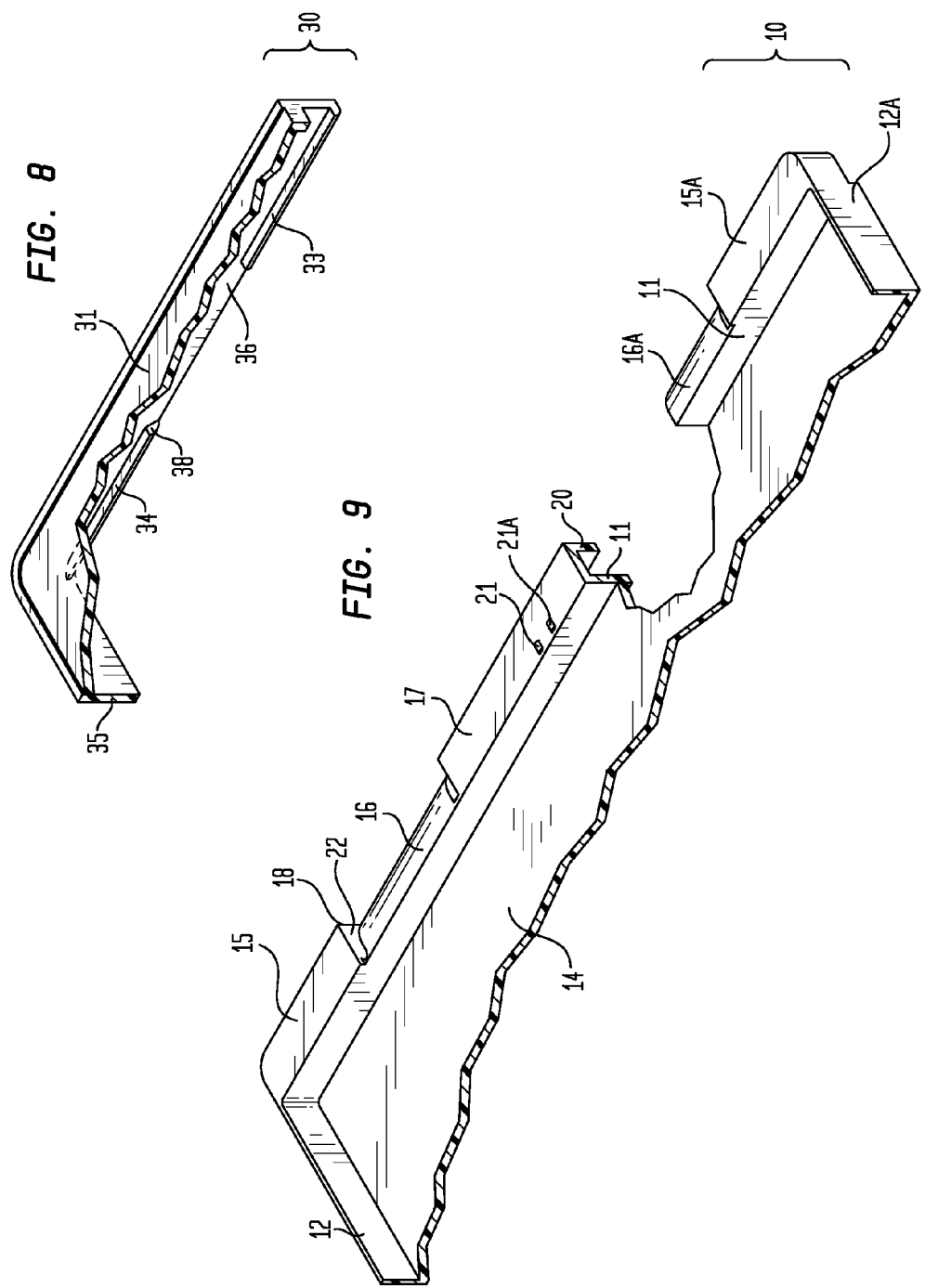

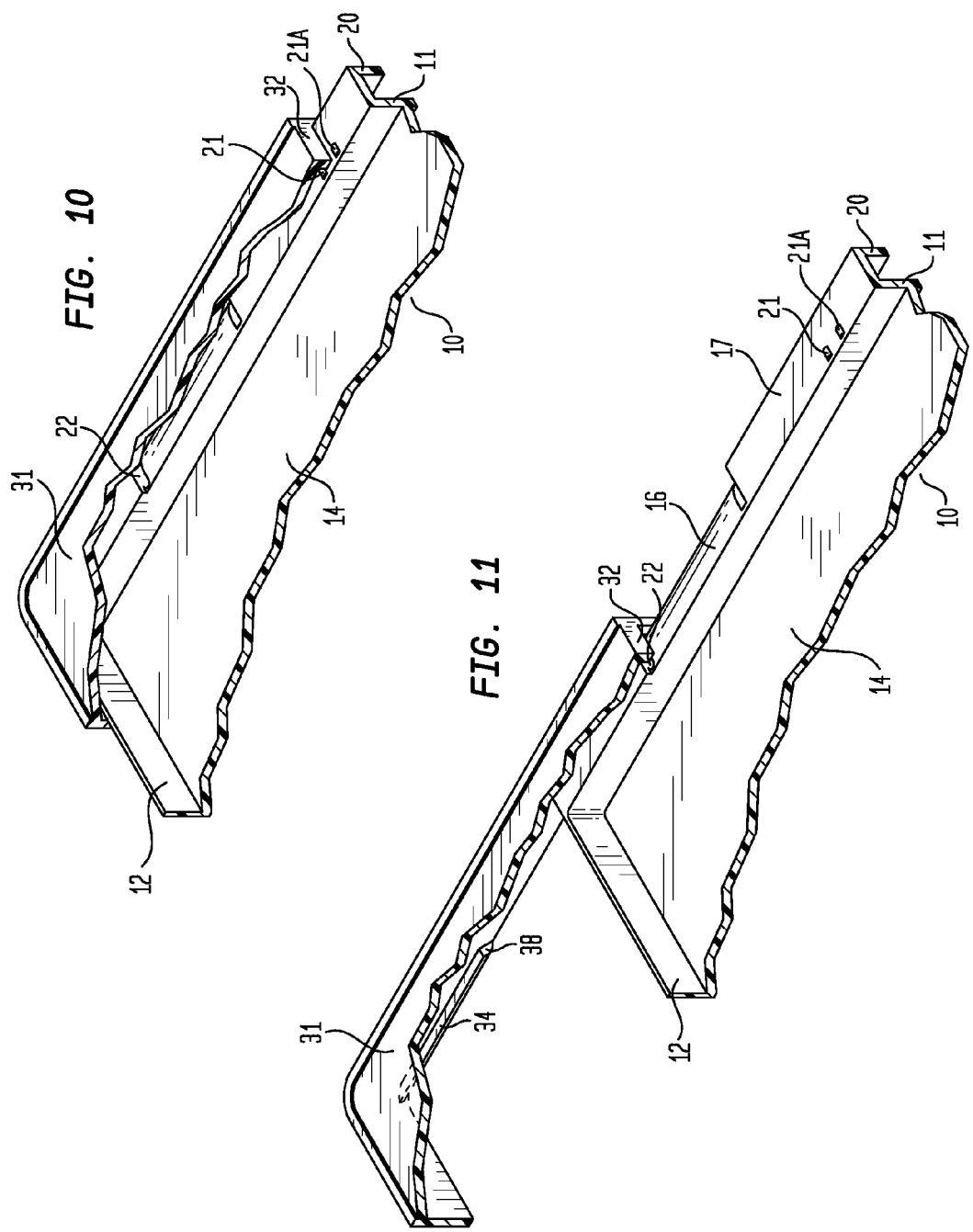

LARGE COMPACT DISK PACKAGE WITH SLIDING COVER MEMBERS

RELATED APPLICATIONS

This application is a continuation of U.S. Provisional Application No.: 60/509,127 filed Oct. 6, 2003.

TECHNICAL FIELD

The invention relates to a packaging concept for storing optically readable and recordable disk devices such as CDs (compact discs), CD-ROMs (compact disk, read-only-memory), CD-RWs (CD-ReWritable disk) and DVDs (digital versatile disc or digital video disc, a type of optical disk technology similar to the CD-ROM).

BACKGROUND OF THE INVENTION

Compact disks were originally designed as a storage/reproduction medium for the digital recording of music. Disks created for this purpose utilize a plastic-coated, aluminized surface having a standard diameter measuring 4.72 inches (12 cm.) and a standard thickness of 1.2 mm. Mini disks have a standard diameter measuring 8 cm. And a standard thickness of 1.2 mm. Audio information is generally placed on only one surface of the disk in digital form as a track of microscopic pits in the thin, reflective aluminum layer. It is the spacing and length of these pits, each being about 1 micron in length, which determines what data the disk player unit "sees".

In order to "play" such a disk, a beam from a semiconductor laser is focused upon the pits through a series of lenses and prisms. Light striking a pit is scattered whereas light hitting the smooth surface between pits is reflected back to a prism through a photo-detector, i.e., a diode, that converts light into an electronic signal. The resultant on and off digital signal is then decoded and fed through an electronic filter, thus converting it from digital form into an analog signal suitable for any hi-fi amplifier.

Audio compact disc technology of the type described above has been combined with a computer application in order to create an optical storage system known as the CD-ROM (compact disc, read only memory), utilizing either the standard 4.72 inch compact disk. Each CD-ROM can store over 700 megabytes of information. A DVD holds a minimum of 4.7 gigabytes of data, enough for a full-length movie.

Blank optical discs are constructed of a layer of a heat-sensitive metal film, an organic polymer (e.g., a plastic) or a combination of both, deposited upon an a plastic substrate. Optical recording techniques deposit digital information upon the surface of the disc by marking this surface in a number of fashions. These techniques include: ablative recording, in which a laser creates a series of pits in the coating layer; bubble forming, in which the laser's heat generates a tiny volume of gas in the underlying polymer, which becomes trapped and thus forms a bubble in the surface of the metal film layer; and crystalline to amorphous phase change, in which the reactive layer of the disc is changed from light-reflecting to transparent by the writing laser.

A protective plastic or lacquer coating on the surface of the CD, CD-ROM, CD-RW or DVD prevents dust or debris from reaching its reflective metal surface. Only significant scratches, gouges or blemishes can interfere with the laser light beam causing a degradation of the stored sound, data or picture.

One common cause of such damaging scratches, gouges and/or blemishes is the removal and/or insertion of laser disk devices of the type described above from or into, respectively, a molded plastic storage case of the type commonly used to hold such disks. These cases contain many sharp edges which, if a disc is carelessly handled, can scratch or gouge the information-bearing surface of the disk and thus result in a loss of some or all of the information contained thereon.

Typical example of such a storage containers are disclosed in U.S. Pat. No. 4,535,888 to Nusselder and U.S. Pat. No. 5,383,553 to Lammerant, et al. These references describe plastic cases suitable for the storage of CD, CD-ROM, CD-RW or DVD disks having high information storage density. Storage cases constructed in this manner are commonly referred to as a "jewel-box" or "jewel case" due to their hinge-type construction consisting of two shallow trays. One tray is intended to hold the CD record whereas the other tray acts as a cover which can be swung open to provide access to the disk, and swung closed to enclose and protect the record. This type of case has a number of drawbacks. It is relatively expensive to manufacture, as well as being subject to breakage due to the fragility of the hinge. Also, it is sometimes hard to open by the elderly and young.

To overcome these disadvantages, various types of slidable-component cases were devised, involving drawers which slid into flat enclosures that had edge openings for this purpose. One patent revealing this drawer-type case is U.S. Pat. No. 5,011,010. However, the proposed construction in this patent was still costly to produce, and had other drawbacks such as the likelihood of breakage and/or malfunction.

A sliding drawer type case is also disclosed in U.S. Pat. No. 4,463,849. The construction shown here is similarly prone to malfunction and breakage, as well as improper reassembling of separable parts and warpage due to the thinness of plastic sections.

U.S. Pat. No. 4,609,105 discloses a sliding drawer type CD case having generally the same drawbacks as already listed above, namely high cost, lack of durability, inconvenience and likelihood to malfunction.

A hinge-and-slide type of CD case is shown in U.S. Pat. No. 5,263,580. The construction and functioning are more complex than with the above-described cases, and in consequence the likelihood of breakage and malfunction is increased, as well as the cost of producing the units.

A sliding cover case is disclosed in U.S. Pat. No. 5,511,659. This case requires a nest formation to receive and hold a compact disk. The base and cover members of the case have cooperable slide mounting means on the base and at least one cover member to facilitate opening and closing of the case. Tracks on the base and cover members are disclosed.

Slidable component cases were devised to overcome many of the mechanical weaknesses of jewel cases such as easily broken hinges. The slidable cases retained the nest piece used to position and hold the disk in place. Ironically, this nest piece, which is intended to protect the disk by holding it immobile, poses the greatest risk for causing damage to the disk. The sharp edges of the hard plastic central spindle and peripheral disk supports can easily scratch and gouge a disk surface as the disks are removed from or replaced in the nest.

The above drawbacks and disadvantages of prior CD and DVD disk cases or packages, such as hinged jewel cases and sliding cover cases and the like, are obviated by the present invention. The present invention provides a novel and improved, hinge less CD/DVD case which is especially durable and not likely to malfunction or become easily broken, as with existing hinged CD or DVD cases and does not require a nest or central spindle to secure and hold the CD or DVD or the like in place.

The inventive case provides an improved CD or DVD disk case as above set forth, which is commensurate in size with existing larger hinged cases generally used for DVD storage such that it can be accommodated in the usual racks designed to accommodate such DVD cases now being used, to hold the present large CD or DVD disk cases.

The inventive case does not require a nest to hold the disk. A nest is known in the art as a recessed area having the same diameter as a disk. The disk sits in the nest and is thereby held immovable within the disk case.

The inventive case provides increased surface area for written and promotional material to be placed on both cover members as well as the inside and outside of the base plate. The inside of the base plate is not available for written and promotional materials in disk cases having a nest.

The inventive case provides an improved disk record case as above described, which is especially easy to open and simple to operate with regard to removal and replacement of the disk.

Still other features of the invention reside in a hinge less disk case which has nibs to control the movements of slidable cover members, a case which always can lay perfectly flat when either open or closed, a case constituted of plastic and not requiring a nest or support means to immobilize and protect the disk.

Still another feature of the case is its ease of assembly. The two cover can be easily snapped down over the base then slid closed. Once assembled, the case resists disassembly. Other features and advantages will hereinafter appear.

BRIEF DESCRIPTION OF THE DRAWINGS

FIG. 3 is sectional view taken along line 3—3 of FIG. 1.

FIG. 4 is sectional view taken along line 4—4 of FIG. 2.

FIG. 5 is sectional view taken along line 5—5 of FIG. 1.

FIG. 8 is a fragmentary view of a lid piece.

FIG. 9 is a fragmentary view of the base.

FIG. 10 is a fragmentary view of a cover member and base in the closed position.

FIG. 11 is a fragmentary view of a cover member and base in the open position.

DESCRIPTION OF PREFERRED EMBODIMENTS

The present invention relates to a case for receiving at least one data storage disk. The case is comprised of two cover members and a base. The base having a substantially flat rectangular bottom plate having a top and a bottom with two side walls and two end walls all projecting upwardly from said bottom plate and connected to lateral edges of said bottom plate. In a preferred embodiment, the disk 40 is free to move laterally within the case. A pair of cover members carried by the base at the top side thereof. The cover members having a substantially flat rectangular top plate having a top and a bottom with lateral edges two side walls and one end wall connected to said lateral edges of said top plate all projecting downward. The cover members having a pair of edges that face each other. Cooperable slide mounting means on the base and one of or preferably both cover members, mounting said member for movement in a plane which is common to the other of said cover members, said mounting means enabling said one cover member to be moved toward and away from the other cover member. Portions of the facing edge of the one member overlying, thereby holding captive a disk that may have been previously inserted in the base when the cover members are closest to each other.

Figure 1:
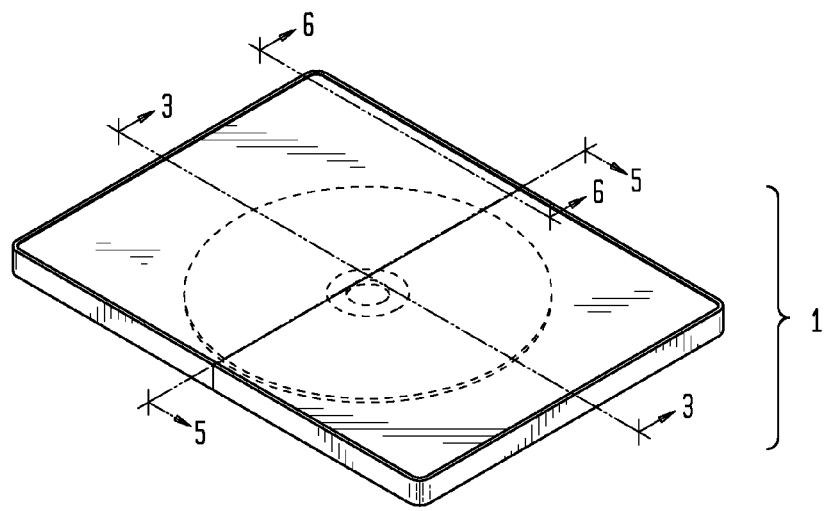
FIG. 1 is a perspective view of the disk record case in its closed position.
Figure 2:
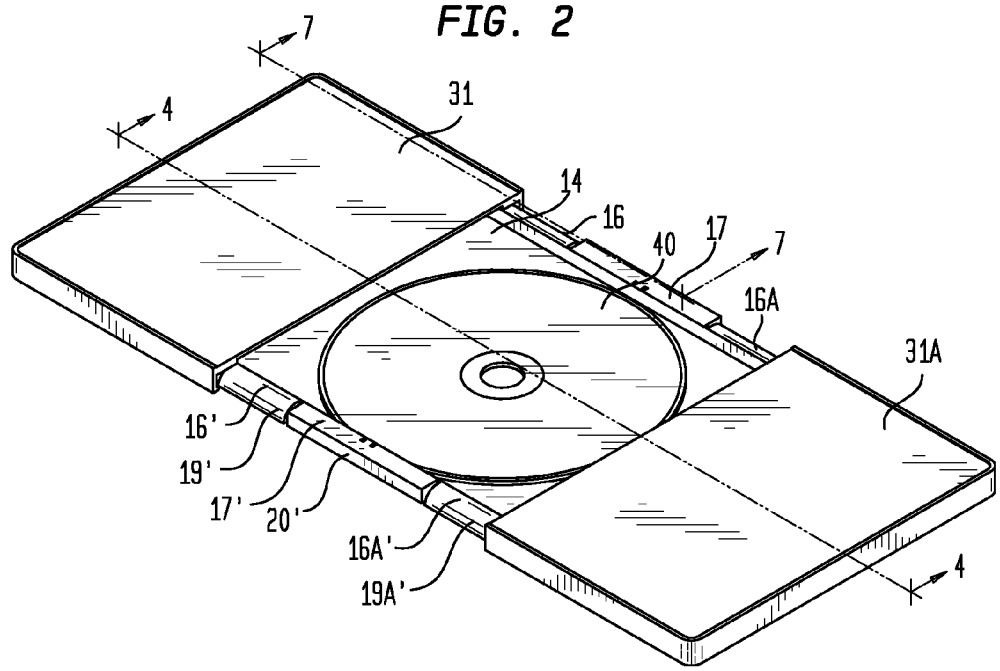
FIG. 2 is a perspective view of the disk record case in its open position.
Figure 6:
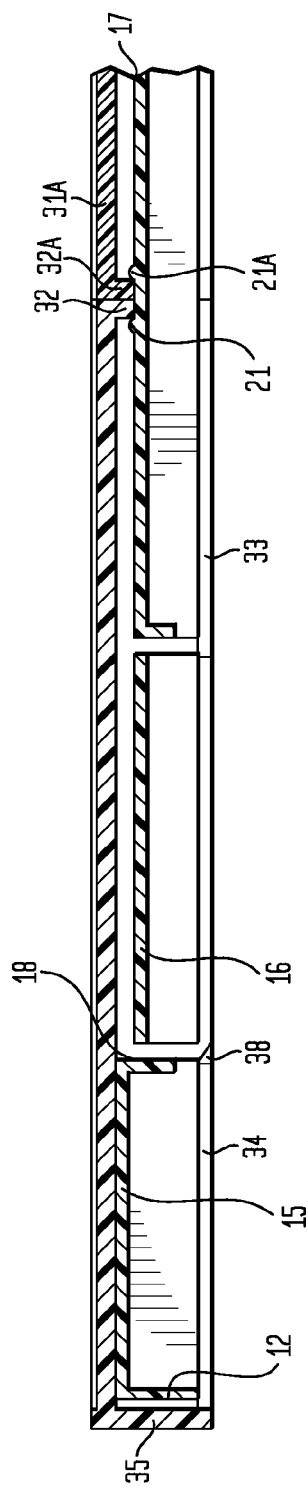
FIG. 6 is partial sectional view taken along line 3—3 of FIG. 1.
Figure 7:
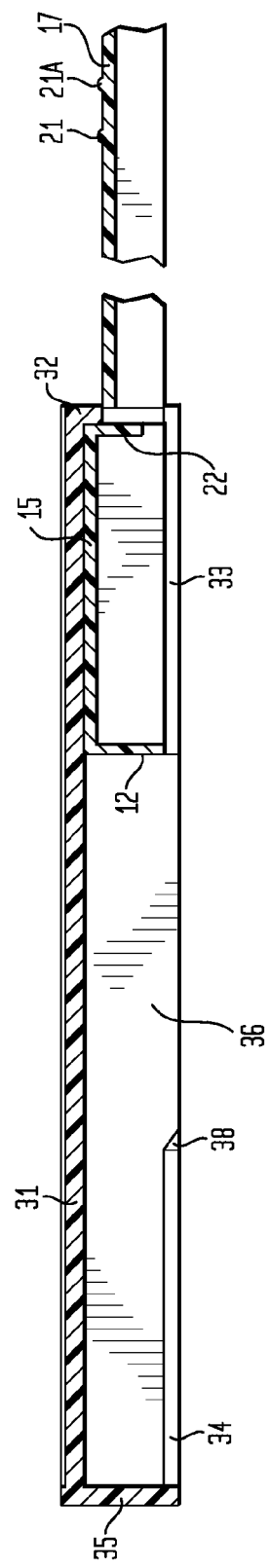
FIG. 7 is partial sectional view taken along line 4—4 of FIG. 2.

The present invention will now be described in detail with the aid of several specific embodiments utilizing FIGS. 1 through 11.

The disk case 1 shown in FIGS. 1, 2, 8 and 9 is comprised of three main components: The base 10 and duplicate cover members 30 and 30A. The cover members 30 and 30A slide over base 10 forming a disk case. The position of disk 40 in the closed 1 and open case is shown. Disk 40 is free to move laterally within the case 10. In addition, optional materials containing decoration or information may be placed within or attached to the base component and/or either or both of the cover members components. The materials, which may contain decoration or information, may be paper, paper board, plastic, polymeric or similar materials. An over wrap may also be used to enclose the entire case.

Base 10 shown in FIGS. 2, 4, 9, 10 and 11 comprises a flat, rectangular bottom plate 14, two inner side walls 11 and 11', two rails, each rail is composed of segments 15, 16, 17, 16A and 15A (15', 16', 17', 16A' and 15A' on the other side); and two corresponding segmented outer side walls 18, 19, 20, 19A and 18A (18', 19', 20', 19A' and 18A' on the other side); and two end walls 12 and 12A all projecting upwardly from plate 14. The result is a tray like structure.

The first rail segment 15 begins at the corners formed between end wall 12 and both inner side wall 11 and outer side wall segment 18. The corners may be rounded, squared or otherwise connected. In another preferred embodiment the corners are not connected. The top plane of rail segment 15 is railed above rail segments 16 17 and the top plane of rail segment 15A is railed above rail segments 17 and 16A. The edge of rail segment 15 and 15A furthest from the end wall 12 and 12A, respectively, acts as a stop for cover member 30 and 30A when opening the case. Cover member nib 32 and 32A will contact and be stopped by the rail segment edge 21 and 21A when the cover member 30 and 30A are moved to the open position, respectively. The implementation is identical for the other side as denoted by an ' in the drawings.

Rail segment 16 and outer wall segment 19 do not meet at essentially right angles as do the other rail segments and outer side walls. Outer wall segment 19 is slanted inward such that the top of outer wall segment 19 is closer to inner wall 11 than the lower edge of outer wall segment 19 is to inner wall 11. In another preferred embodiment, outer wall segment 19 is curved such that the top of outer wall segment 19 is closer to inner wall 11 than the lower edge of outer wall segment 19 is to inner wall 11. As a result, rail segment 16 is narrower than rail segments 15 and 17. The same is true for rail segments 16A, 16' and 16A' with respect to their corresponding constructs.

Rail segment 17 has nib 21 and 21A positioned such that corresponding nib 32 and 32A of cover member 30 and 30A, respectively, will pass over nib 21 and 21A when cover member 30 and 30A are closed. Nib 21 and 21A will prevent cover member 30 and 30A, respectively, from spontaneously opening.

Cover member 30 shown in FIG. 8 has downwardly extending end wall 35 and two parallel side walls 36 and 36'. Each side wall 36 and 36' has inward facing shelf like extensions 33 and 34 and 33' and 34', respectively, at their bottom edge, said extensions are parallel to plate 31 and perpendicular to side wall 36 and 36'. The shelf like extention 33 and 33' begins at or near the open end of side wall 36 and 36', respectively, is parallel to the plate 31 and extends for a portion of the length of side wall 36 and 36', respectively. The length of extension 33 and 33' is equal to or less than the length of rail segment 16 and 16', respectively. Side walls 36 and 36', plate 31 and extensions 33 and 34 and 33' and 34' form an opposing pair of guides. Extension 34 and 34' begin at end wall 35. The end of extension 34 and 34' away from end wall 35 is extension end 38 and 38' which in a preferred embodiment may be beveled or rounded to facilitate ease of closing the cover member 30. The distance from extension edge 38 and 38' to nib 32 and 32', respectively, is equal to or greater than the combined length of rail segments 15 and 16 and 15' and 16', respectively. The above is identical for cover member 30A.

Cover member pieces 30 and 30A can be identical to each other. The cover member pieces are a flat plate 31 with two side walls 36 and 36' and one end wall 35. The two side walls 36 and 36' may be connected with or formed together with their adjoining end wall 35. In a preferred embodiment, the end and side walls are joined or molded together. A portion of cover member 30, opposite to end wall 35, in a preferred embodiment, is removed to facilitate removal of the disk when the lids are slid to their open position. In the closed position, the opening between the lids is smaller than disk 40 thereby preventing its removal. The exact size and shape of the opening is easily determined by the size of the disc and the distance the lids can be moved by the sliding action. In another preferred embodiment, there is no opening between cover members 30 and 30A when they are closed.

All of the pieces of the case may be formed by injection molding of suitable materials such as styrene or other suitable polymeric or plastic materials. In addition, the pieces may be formed from malleable materials such as metals and deformable material such as paper or fiber boards.

It will now be seen that the present improved disk case has very few components which are characterized by great simplicity whereby exceptionally low manufacturing and assembly cost is achieved, while improving reliability and resistance to breakage or malfunctioning. The case can be accommodated in existing racks, holders, displays and then like.

The present invention is, of course, in no way restricted to the specific disclosure of the specification and drawings, but also encompasses any variations and modifications within the scope of the appended claims.

What is claimed is:

1. A case for receiving at least one data storage disk, said case comprising:
    two cover members and a base;
    said base having a substantially flat rectangular bottom plate having a top and a bottom with two side walls and two end walls all projecting upwardly from said bottom plate and connected to lateral edges of said bottom plate;
    each of said two side walls is topped with a pair of first rail segments, a pair of second rail segments and a third rail segment;
    said pair of first rail segments having a height greater than said pair of second rail segments and said third rail segment;
    each of said pair of first rail segments begin at the corners formed between one of said two end walls and a corresponding one of said two side walls;
    each of said pair of second rail segments beginning at an end of a corresponding one of said pair of first rail segments and continuing to a corresponding end of the third rail segment, wherein the third rail segment is between said pair of second rail segments;
    each of the cover members carried by the base at the said top side thereof;
    each of said cover members having a substantially flat rectangular top plate having a top and a bottom with lateral edges, two side walls and one end wall connected to said lateral edges of said top plate, the two side walls and one end wall projecting downward;
    each of said cover members having an edge, each edge facing the other;
    cooperable slide mounting means on said base and each of said cover members, mounting each of said cover members for movement in a plane which is common to each of said cover members, said mounting means enabling said one cover member to be moved toward and away from a remaining cover member;
    portions of one said edge of said one cover member overlying the disk when said cover members are closest to each other, thereby holding captive the disk that may have been previously inserted in the base.

2. A case according to claim 1, wherein each edge is spaced apart and concave in configuration.

3. A case according to claim 1, wherein said base and said cover members having cooperable means for yieldably holding the cover members in their positions closest to each other.

4. A case according to claim 3, wherein said cooperable means comprises said two end walls and cooperable nibs disposed on each of said cover members.

5. A case according to claim 1, wherein said base and said cover members having cooperable means for yieldably holding the cover members in their positions farthest from each other.

6. A case according to claim 5, wherein said cooperable means comprises said two end walls and cooperable nibs disposed on each of said cover members.

7. A case according to claim 1 further comprising a panel of sheet material, said panel covering the bottom side of the said base.

8. A case according to claim 1, wherein said cooperable slide mounting means of each of said cover members comprises two downward extending side walls with an inward facing shelf-like extension on the low edge of each of said side walls.

9. A case according to claim 1, wherein an outer wall segment of each of said pair of second rail segments is slanted inward.

10. A case for receiving at least one data storage disk, said case comprising:
    two cover members and a base;
    said base having a substantially flat rectangular bottom plate having a top and a bottom with two side walls and two end walls all projecting upwardly from said bottom plate and connected to lateral edges of said bottom plate;

each of said two side walls is topped with a pair of first rail segments, a pair of second rail segments and a third rail segment;

said pair of first rail segments having a height greater than said pair of second rail segments and said third rail segment;

each of said pair of first rail segments begin at the corners formed between one of said two end walls and a corresponding one of said two side walls;

each of said pair of second rail segments beginning at an end of a corresponding one of said pair of first rail segments and continuing to a corresponding end of the third rail segment, wherein the third rail segment is between said pair of second rail segments;

each of the cover members carried by the base at the said top side thereof;

each of said cover members having a substantially flat rectangular top plate having a top and a bottom with lateral edges, two side walls and one end wall connected to said lateral edges of said top plate, the two side walls and one end wall projecting downward;

each of said cover members having an edge, each edge facing the other;

cooperable slide mounting means on said base and both of said cover members, mounting both of said cover members for movement in a plane which is common to both of said cover members, said mounting means enabling said cover members to be moved toward and away from each other;

portions of one said edge of said one cover member overlying the disk when said cover members are closest to each other, thereby holding captive the disk that may have been previously inserted in the base.

11. A case according to claim 10, wherein each edge is spaced apart and concave in configuration.

12. A case according to claim 10, wherein said base and said cover members having cooperable means for yieldably holding the cover members in their positions closest to each other.

13. A case according to claim 12, wherein said cooperable means comprises said two end walls and cooperable nibs disposed on each of said cover members.

14. A case according to claim 10, wherein said base and said cover members having cooperable means for yieldably holding the cover members in their positions farthest from each other.

15. A case according to claim 14, wherein said cooperable means comprises said two end walls and cooperable nibs disposed on each of said cover members.

16. A case according to claim 10 further comprising a panel of sheet material, said panel covering the bottom side of the said base.

17. A case according to claim 10, wherein said cooperable slide mounting means of each of said cover members comprises two downward extending side walls with an inward facing shelf-like extension on the low edge of each of said side walls.

18. A case according to claim 10, wherein an outer wall segment of each of said pair of second rail segments is slanted inward.

* * * * *